US008902851B2

(12) United States Patent
Mahdi et al.

(10) Patent No.: US 8,902,851 B2
(45) Date of Patent: Dec. 2, 2014

(54) SUPPORT FOR CONTINUITY OF SINGLE RADIO VOICE CALL COMMUNICATIONS IN A TRANSITION TO A CIRCUIT SWITCHED COMMUNICATIONS NETWORK

(75) Inventors: Kaniz Mahdi, Carrollton, TX (US); Saso Stojanovski, Paris (FR)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 12/989,755

(22) PCT Filed: Apr. 30, 2009

(86) PCT No.: PCT/US2009/002651
§ 371 (c)(1),
(2), (4) Date: Oct. 26, 2010

(87) PCT Pub. No.: WO2009/134399
PCT Pub. Date: Nov. 5, 2009

(65) Prior Publication Data
US 2011/0044327 A1    Feb. 24, 2011

Related U.S. Application Data

(60) Provisional application No. 61/049,180, filed on Apr. 30, 2008.

(51) Int. Cl.
*H04W 4/00* (2009.01)
*H04L 12/66* (2006.01)
*H04M 1/62* (2006.01)
*H04L 29/06* (2006.01)
*H04W 36/00* (2009.01)

(52) U.S. Cl.
CPC ........ *H04L 65/1016* (2013.01); *H04L 65/1083* (2013.01); *H04W 36/0022* (2013.01)
USPC ...... 370/331; 370/356; 379/88.12; 455/422.1

(58) Field of Classification Search
None
See application file for complete search history.

(56) References Cited

U.S. PATENT DOCUMENTS 7,885,234 B2 * 2/2011 Ejzak ............................ 370/331
7,995,565 B2 * 8/2011 Buckley et al. ............... 370/353
(Continued)

FOREIGN PATENT DOCUMENTS

CN    1881958    12/2006
CN    1897729    1/2007
(Continued)

OTHER PUBLICATIONS

International Searching Authority: Notification of Transmittal of the International Search Report, Written Opinion of Int'l Searching Authority, or the Declaration dated Jul. 2, 2009.

(Continued)

*Primary Examiner* — Melanie Jagannathan
(74) *Attorney, Agent, or Firm* — Meyertons, Hood, Kivlin, Kowert & Goetzel, P.C.

(57) ABSTRACT

The present invention establishes a new protocol that supports the continuity of a single radio voice call onto a circuit switched communications system through the use of a special addressing identifier. This special identifier is called the single radio voice call identifier, and it designates the use of a single radio voice call continuity procedure for the transition to the circuit switched communication system. The applications server receives the single radio identifier and performs the transfer of the single radio voice session without the need for other address or identifier information, and also uses the single radio identifier or a new message type to initiate the correlation of parameters related to service control session establishment in later steps.

22 Claims, 3 Drawing Sheets

(56) References Cited

U.S. PATENT DOCUMENTS

| | | | |
|---|---|---|---|
| 8,214,512 B2* | 7/2012 | Elburg et al. | 709/228 |
| 2007/0014260 A1 | 1/2007 | Seo | |
| 2007/0058791 A1 | 3/2007 | Liu et al. | |
| 2007/0254625 A1* | 11/2007 | Edge | 455/404.1 |
| 2008/0080480 A1 | 4/2008 | Buckley et al. | |
| 2008/0267128 A1* | 10/2008 | Bennett et al. | 370/331 |
| 2008/0318565 A1* | 12/2008 | Stojanovski et al. | 455/422.1 |

FOREIGN PATENT DOCUMENTS

| | | |
|---|---|---|
| CN | 101159979 | 4/2008 |
| WO | 2010015203 | 2/2010 |

OTHER PUBLICATIONS

International Searching Authority: Written Opinion of the International Searching Authority dated Jul. 2, 2009.
International Searching Authority: International Search Report dated Jul. 2, 2009.
First Office Action in Chinese Application No. 200980115440.9, issued Nov. 16, 2012, pp. 1-22.
3GPP TS 23.216, 3rd Generation Partnership Project; Technical Specification Group Services and System Aspects; Single Radio Voice Call Continuity (SRVCC); Stage 2 (Release 8), Apr. 2008, pp. 1-26.
3GPP TS 23.237, V0.2.2, 3rd Generation Partnership Project; Technical Specification Group Services and Architecture; IP Multimedia Subsystem (IMS) Service Continuity; Stage 2 (Release 8), Apr. 2008, pp. 1-17.
3GPP TSG SA WG2 Meeting #64, "Migration of VCC Domain Transfer Procedures after Drafting", Apr. 2008, pp. 1-3.
Extended European Search Report from Application No. 09739202. 1, issued May 15, 2014, pp. 1-14.

* cited by examiner

SUPPORT FOR CONTINUITY OF SINGLE RADIO VOICE CALL COMMUNICATIONS IN A TRANSITION TO A CIRCUIT SWITCHED COMMUNICATIONS NETWORK

RELATED APPLICATION DATA

This application is related to Provisional Patent Application Ser. No. 61/049,180 filed on Apr. 30, 2008, and priority is claimed for this earlier filing under 35 U.S.C. §119(e). The Provisional Patent Applications are incorporated by reference into this utility patent application.

TECHNICAL FIELD OF THE INVENTION

A method for supporting continuity of single radio voice call communications in a transition to a circuit switched network.

BACKGROUND OF THE INVENTION

IP-based mobile systems provide for communication using mobile user equipment on wireless communication networks. Among other elements, the transition of connectivity from one wireless communication system to another would involve a source network and a target network in a transition of communication services. The user equipment, source network, and target network may be called different names depending on the nomenclature used and the base technology used in the particular network configurations or communication systems.

For instance, the term "user equipment" includes a mobile node or mobile communication unit (e.g., mobile terminal, "smart phones", nomadic devices such as laptop PCs with wireless connectivity, as described in greater detail below), and "user equipment" is sometimes called mobile nodes, mobile unit, mobile terminal, mobile device, or similar names depending on the nomenclature adopted by particular system providers. Direct wireless connectivity to a cellular network supports various makes and models of mobile terminals ("cell phones") having various features and functionality, such as Internet access, e-mail, messaging services, and the like. But, generally, "user equipment" can encompass PC's having cabled (e.g., telephone line ("twisted pair"), Ethernet cable, optical cable, and so on) connectivity to the wireless network, as well as direct wireless connectivity to the cellular network.

In great majority of deployed mobile networks voice calls are provided over the Circuit Switched (CS) domain. In new mobile network deployments (especially with the advent of 3G High Speed Packet Access (HSPA) and the future E-UTRAN access) it is expected that voice will be supported over the Packet Switched (PS) domain via the IP Multimedia Subsystem (IMS) specified by 3GPP. In order to support voice call continuity between the IMS and the legacy CS domain, 3GPP has initiated specification work on Voice Call Continuity (VCC) in Release-7 specification (TS° 23.206) and this was later generalized to apply to non-voice IMS sessions and was referred to as IMS Session Continuity in Release-8 (TS° 23.237). In the VCC approach for voice continuity, the voice call/session is anchored in a Back-to-Back User Agent (B2BUA) located in the IMS network and referred to as the Session Continuity Control Application Server (SCC AS).

User equipment engaged in a voice call over the PS domain network (in this context the source network) establishes a so-called IMS Access Leg with the SCC AS. If the user equipment is transitioned to a circuit switched communication network (in this context the target network), the circuit switched network establishes a CS Access Leg connection with the SCC AS, which eventually leads to the SCC AS performing the transfer of the voice session on this CS Access Leg connection and releasing of the network resources associated with the IMS Access Leg connection. In order to identify the session that needs to be transferred, however, the SCC AS needs to receive an explicit session identifier. This is typically how the procedure would work in a "dual radio" context, where the CS Access Leg is established by the terminal itself, so it can provide an explicit address identifier for the session that it wishes to transfer.

However, this is not possible in the "single radio" environment (under consideration here), because in single radio environment the CS Access Leg establishment is triggered from the CS domain core network (i.e. the MSC Server enhanced for single radio VCC), rather than from the user equipment. Because the prior art systems (CS domain core network) are unable to provide the explicit identifier of the session that the user wishes to transfer, a new method is needed to allow the SCC AS to identify the session that the user wishes to transfer.

SUMMARY OF THE INVENTION

The present invention resolves the problem of identification of the session that needs to be transferred to the circuit switched system by establishing a new protocol that supports the continuity of a single radio voice call onto a circuit switched communications system through the use of a special addressing identifier. This special identifier is called the single radio voice call procedure identifier (shortly "single radio identifier" or "SRI"), and it designates the use of a single radio voice call continuity procedure for the transition to the circuit switched communication system. The SCC applications server receives the single radio identifier and performs the transfer of the active voice session without the need for other address or identifier information that would normally have been required in prior art transition protocols (e.g., "dual radio" systems). The applications server also uses the single radio identifier or a new message type to correlate the service control session establishment in later steps, which assists with the allocation of resources and improves the performance of the communications systems after the transition of services to the circuit switched communication system.

BRIEF DESCRIPTION OF THE DRAWINGS

The objects and features of the invention will become more readily understood from the following detailed description and appended claims when read in conjunction with the accompanying drawings in which like numerals represent like elements and in which:

The objects and features of the invention will become more readily understood from the following detailed description and appended claims when read in conjunction with the accompanying drawings in which like numerals represent like element.

DETAILED DESCRIPTION OF THE PREFERRED EMBODIMENTS

Figure 1:
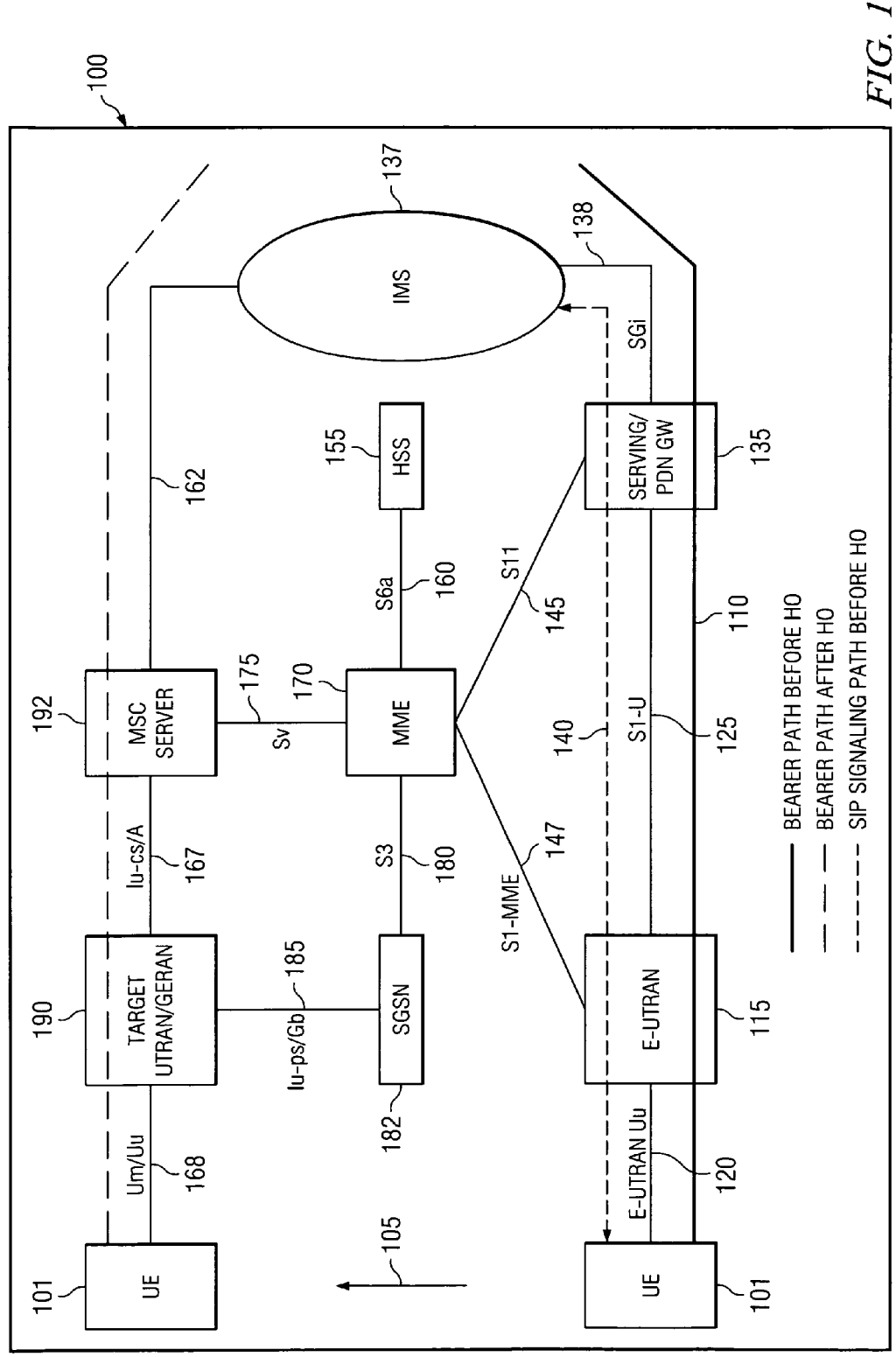
FIG. 1 is the architecture for single radio voice call continuity between packet-based E-UTRAN access and GERAN or UTRAN based circuit switched access as specified in 3GPP TS° 23.216.

In FIG. 1, the overall architecture for single radio voice call continuity between a packet-based E-UTRAN access and a GERAN or UTRAN based circuit switched access 100 showing a single radio voice call transition for user equipment 101. Prior to transition to the circuit switched network, the user equipment 101 is coupled to other servers, user equipment and the IP Multimedia Subsystem (IMS) 137 via connection 110 through the E-UTRAN server 115 and the Serving/PDN GW gateway 135. The IMS subsystem 137 can also communicate with the user equipment 101 via line 140. After transition to the circuit switched network, the user equipment 101 is coupled to other servers, user equipment, or the IMS 137 through the Target UTRAN/GERAN server 190 and the MSC Server 192. The IMS network 137 possesses the Session Continuity Control (SCC) Application Server (not shown) used in the transition of the user equipment 101 voice call from the source network to the target network.

Specifically, on the source network, the user equipment 101 is coupled to the E-UTRAN server 115 via connection 120, and the E-UTRAN server 115 is coupled to the Serving/PDN GW 135 via connection 125. And, the Serving/PDN GW 135 is coupled to the IMS network 137 through connection 138. The E-UTRAN is coupled to the MME server 170 through the S1-MME connection 147, and the Serving/PDN GW 135 is coupled to the MME server 170 through the $S_{11}$ connection 145.

The MME server 170 is coupled to the Home Serving Server 155 through the SGa connection 160. The MME server 170 is coupled to the MSC Server 192 via the Sv connection 175, and the MME Server 170 is coupled to the SGSN server 182, which is coupled to the Target UTRAN/GERAN server 190 via the S3 connection 180 and the Iu-ps/GS connection 185, respectively.

On the target network, the user equipment 101 is coupled to the target UTRAN/GERAN server 190 via the Um/Uu connection 168, and the target UTRAN/GERAN server is coupled to the MSC Server 192 via the Iu-cs/A connection 167. The MSC Server 192 is coupled to the IMS network 137 via connection 152.

The invention covers the protocol of transitioning the user equipment 101 from the connectivity to the E-UTRAN server 115 and Serving/PDN GW gateway 135 on the source network to the Target UTRAN/GERAN 190 and MSC Server 192 on the target network. The target network would normally acquire specific address and identifier information for the user equipment prior to transition from the serving entities and servers on the source network, but the prior art protocols (e.g. dual radio) operated on the source network do not normally permit the serving entities to process or possess this type of specific address and identifier information. Further, it is important for the transition to be designated as a single radio voice call for proper handling of the transition and the allocation and conservation of network resources. The present invention provides a single radio voice call identifier SRI that provides alternative information to satisfy the need for the circuit switched target network to acquire the address and identifier information.

Figure 2:
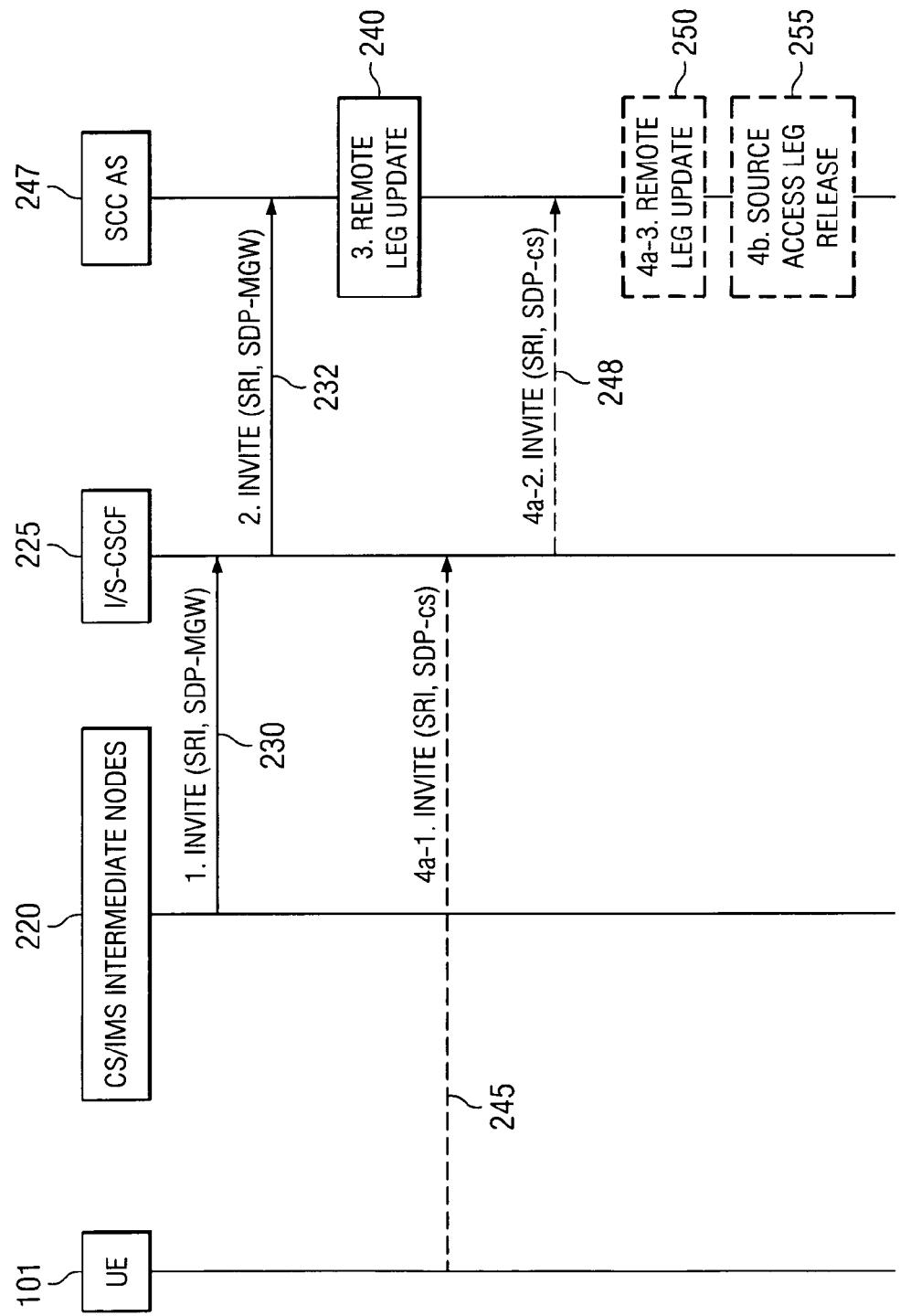
FIG. 2 is a message sequence showing the use of the single radio voice call procedure identifier in the present invention; and, FIG. 3 is a message sequence showing the use of the single radio voice call procedure identifier in the present invention and a new message type.

In the present invention referring to FIG. 2, the circuit switched(CS)/IMS intermediate nodes 220 transmit an INVITE message 230 to the Intermediate Servers (I-S/CSCF) servers 225 where the INVITE message includes a single radio voice call identifier SRI as well as a session description protocol information/media description (SDP-MGW) parameters. The session description protocol information/media description (SDP-MGW) parameters in message 230 include IP addresses, port numbers, and other description information for the user equipment connections to the network.

The Intermediate Servers (I-S/CSCF) servers 225 transmit an INVITE message 232 to the session continuity control application server SCC/AS 247 on the IMS subsystem network 137. The INVITE message 232 also includes a single radio voice call identifier SRI as well as a session description protocol information/media description (SDP-MGW) parameters. The session continuity control application server 247 on the IMS network 137 will use the single radio voice call identifier SRI to determine that a transfer of the user equipment single radio voice call has been requested. Upon receipt, the SCC/AS application server 247 will perform the transfer of the active voice session for the single radio voice call by updating the access leg connections with the appropriate information for the target circuit switched connections in step 240, which includes the media description and other information needed to support the transition of the single radio voice call on the circuit switched target network.

If the user equipment is capable of establishing a Packet Switched (PS) connection in parallel to the circuit switched (CS) domain voice call (e.g. if the access network is UTRAN), an INVITE transmission 245 is subsequently sent from the user equipment 101 to the Intermediate Servers (I-S/CSCF) servers 225 where the INVITE message includes a single radio voice call identifier SRI as well as a session description protocol information/circuit switch (SDP-cs) parameters. The session description protocol information/circuit switch (SDP-cs) parameters in message 245 include IP addresses, port numbers, and other description information for the user equipment connections to the circuit switched target network.

The Intermediate Servers (I-S/CSCF) 225 transmit an INVITE message 248 to the session continuity control application server SCC/AS 247 on the IMS network 137. The INVITE message 248 also includes a single radio voice call identifier SRI as well as a session description protocol information/circuit switch (SDP-cs) parameters. In step 250, the session continuity control application server SCC/AS 247 on the IMS network 137 will use the single radio voice call indicator SRI to correlate the access transfer request with the access transfer request received for the active session previously received in INVITE message 232. In step 255, the SCC/AS 247 will also release the resources associated with the source network access leg.

Figure 3:
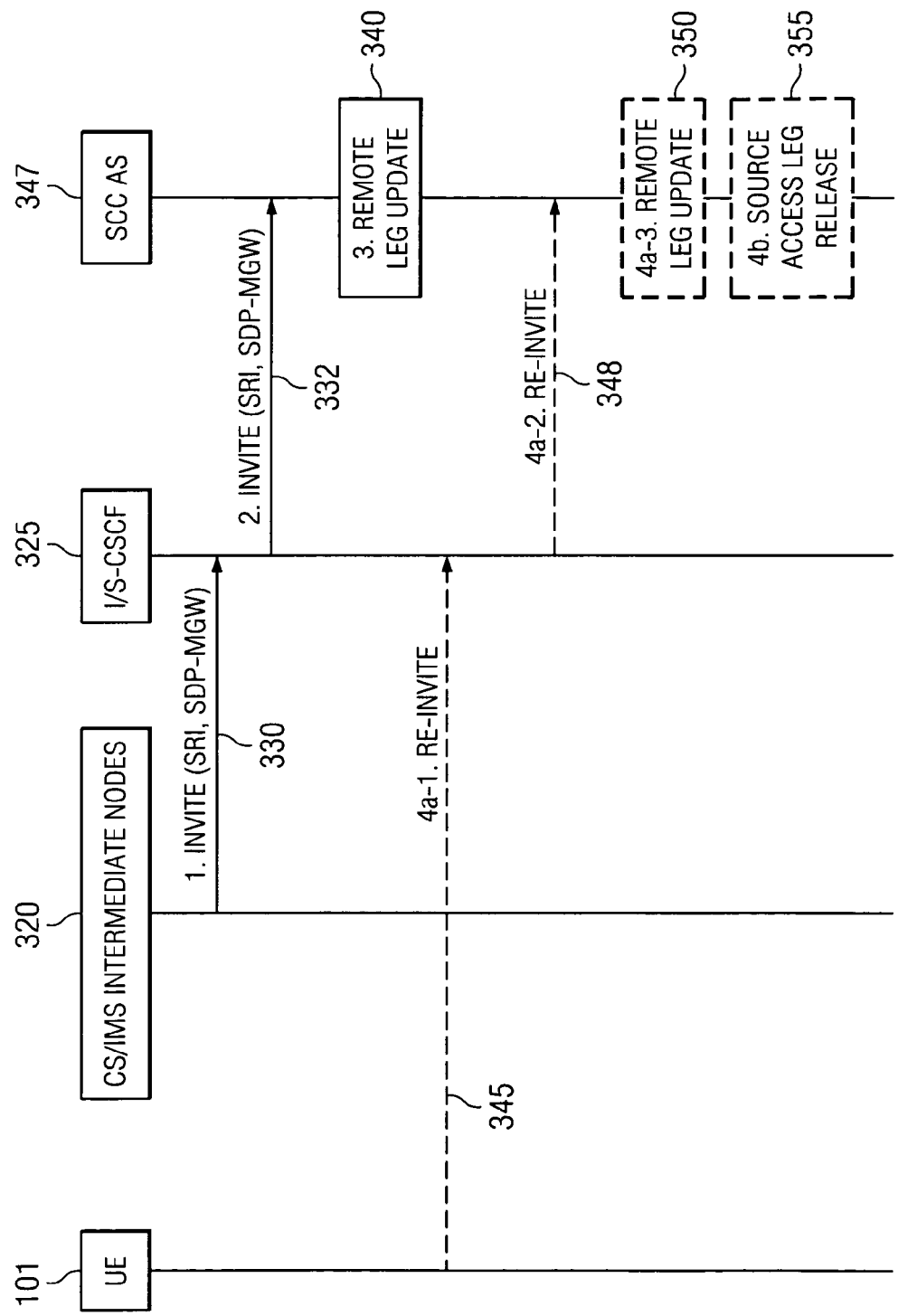

In the present invention referring to FIG. 3, the circuit switched(CS)/IMS intermediate nodes 320 transmit an INVITE message 330 to the Intermediate Servers (I-S/CSCF) servers 325 where the INVITE message includes a single radio voice call identifier SRI as well as a session description protocol information/media description (SDP-MGW) parameters. The session description protocol information/media description (SDP-MGW) parameters in message 330 include IP addresses, port numbers, and other description information for the user equipment connections to the network.

The Intermediate Servers (I-S/CSCF) servers 325 transmit an INVITE message 332 to the session continuity control application server SCC/AS 347 on the IMS network 137. The INVITE message 332 also includes a single radio voice call identifier SRI as well as a session description protocol information/media description (SDP-MGW) parameters. The session continuity control application server 347 on the IMS network 137 will use the single radio voice call identifier SRI to determine that a transfer of the user equipment single radio voice call has been requested. Upon receipt, the SCC application server 347 will perform the transfer of the active session for the single radio voice call by updating the access leg connections with the appropriate information for the target circuit switched connections in step 340, which includes the media description and other information needed to support the transition of the single radio voice call on the circuit switched target network.

Subsequently, a RE-INVITE transmission message 345 is sent from the user equipment 101 to the Intermediate Servers (I-S/CSCF) servers 325 where the RE-INVITE message, by its message format, indicates to the servers that it is related to an existing SIP dialog. The Intermediate Servers (I-S/CSCF) 325 transmit a RE-INVITE message in step 348 to the session continuity control application server SCC/AS 347 on the IMS network 137. In step 350, the session continuity control application server 347 on the IMS network 137 will use the RE-INVITE message and associated information therein to correlate the access transfer request with the access transfer request received for the voice session previously received in INVITE message 332. In step 355, the SCC/AS 347 will also release the resources associated with the source network access leg.

Modifications of the present invention allow for the transition of the single radio voice call to a circuit switched network to be modified to accommodate different identifiers as long as security associations are valid and other necessary requirements are maintained. While preferred embodiments of the invention have been shown and described, modifications thereof can be made by one skilled in the art without departing from the spirit and teachings of the invention. For example, the same solution also applies to the architecture for single radio voice call continuity from IMS over 3G UTRAN/HSPA access to GERAN/UTRAN CS domain access. The embodiments described herein are exemplary only, and are not intended to be limiting. Many variations and modifications of the invention disclosed herein are possible and are within the scope of the invention.

Having described the invention, we claim:

1. A method for supporting the transition of a voice call on a user equipment connected to a packet switched source network to a circuit switch target network, the user equipment using a single radio, comprising the steps of:

receiving, from a circuit switch network node, a first invite transition request message at an intermediate server, the first invite transition request message having a single radio voice call continuity request identifier and session description protocol information associated with the connection of the user equipment with the target network, wherein said first invite transition request message is initiated by the circuit switch network node and not at the behest of the user equipment;

transmitting the first invite transition request message to an application server, the first invite transition request message having the single radio voice call continuity request identifier, the application server transitioning the support for the user equipment to the circuit switch target network based on the presence of the single radio voice call continuity request identifier;

receiving a second invite transition request message at the intermediate server, the second invite transition request message having a single radio voice call continuity request identifier and session description protocol information indicating the use of a circuit switched resource at the target network for a media of the session; and, transmitting the second invite transition request message to the application server, the second invite transition request message having the single radio voice call continuity request identifier such that the application server is capable of correlating the first invite request message with the second invite request message, and the application server releasing resources on the source network after receiving the second invite transition request.

2. The method in claim 1 wherein the session description protocol information in the first invite message includes an IP addressing for the target network.

3. The method in claim 1 wherein the session description protocol information in the first invite message includes a port number used for the target network.

4. The method in claim 1 wherein the session description protocol information in the second invite message includes an IP addressing for the target network.

5. A method for supporting the transition of a voice call on a user equipment connected to a packet switched source network to a circuit switch target network, the user equipment using a single radio, comprising the steps of:

receiving, from a circuit switch network node not at the behest of the user equipment, a first invite transition request message at an intermediate server, the first invite transition request message having a single radio voice call continuity request identifier and session description protocol information associated with the connection of the user equipment with the target network, wherein said first invite transition request message is initiated the circuit switch network node and not at the behest of the user equipment; and, transmitting the first invite transition request message to an application server, the first invite transition request message having the single radio voice call continuity request identifier such that the application server is capable of transitioning the support for the user equipment to the circuit switch target network based on the presence of the single radio voice call continuity request identifier.

6. The method in claim 5 wherein the session description protocol information in the first invite message includes an IP addressing for the target network.

7. The method in claim 5 wherein the session description protocol information in the first invite message includes a port number used for the target network.

8. The method in claim 5 further comprising the steps of:

receiving a second invite transition request message at the intermediate server, the second invite transition request message having a correlation information and session description protocol information indicating the use of a circuit switched resource at the target network for media of the session; and, transmitting an invite transition request message to the application server, the second invite transition request message having correlation information, the application server correlating parameters received from the first invite request message with parameters received from the second invite request messages based on the invite message type such that the application server is capable of releasing resources on the source network after receiving the second invite transition request.

9. The method in claim 8 wherein the session description protocol information in the first invite message includes an IP addressing for the target network.

10. The method in claim 8 wherein the session description protocol information in the first invite message includes a port number used for the target network.

11. The method in claim 8 wherein the session description protocol information in the second invite message includes an IP addressing for the target network.

12. A method for supporting the transition of a single radio voice call on a user equipment connected to a packet switched source network to a circuit switch target network, the user equipment using a single radio, comprising the steps of:

receiving, from a circuit switch network node, a first invite transition request message at an application server, the first invite transition request message having the single radio voice call continuity request identifier and session and description protocol information associated with the connection of the user equipment with the target network, the application server transitioning the support for the user equipment to the circuit switch target network based on the presence of the single radio voice call continuity request identifier, wherein said first invite transition request message is initiated by the circuit switch network node and not at the behest of the user equipment; and, receiving a second invite transition request message at the application server, the second invite transition request message having correlation information and session description protocol information indicating use of a circuit switched resource at target network for media of the session such that the application server is capable of correlating parameters received from the first invite request message with parameters received from the second invite request messages based on the message type, and such that the application server is capable of releasing resources on the source network after receiving the second invite transition request.

13. The method in claim 12 wherein the session description protocol information in the first invite message includes an IP addressing for the target network.

14. The method in claim 12 wherein the session description protocol information in the first invite message includes a port number used for the target network.

15. The method in claim 12 wherein the session description protocol information in the second invite message includes an IP addressing for the target network.

16. A communication system supporting the transition of a voice call on user equipment using a single radio comprising:

a source network having one or more servers and one or more intermediate servers supporting the voice call on the user equipment using a single radio, the servers being coupled to an application server, a target network having one or more servers and one or more intermediate servers supporting the voice call on the user equipment using a single radio, and servers being coupled to the application server, the application server receiving, from a circuit switch network node, a first invite transition request message having the single radio voice call continuity request identifier and session description protocol information associated with the connection of the user equipment with the target network and the application server transitioning the support for the user equipment to the circuit switch target network based on the presence of the single radio voice call continuity request identifier, wherein said first invite transition request message is initiated by the circuit switch network node and not at the behest of the user equipment.

17. The communications network in claim 16 wherein the session description protocol information in the first invite message includes an IP addressing for the target network.

18. The communications network in claim 16 wherein the session description protocol information in the first invite message includes a port number used for the target network.

19. The communications network in claim 16 wherein the application server receives a second invite transition request message, the second invite transition request message having correlation information and session description protocol information indicating use of a circuit switched resource at the target network for media of the session, the application server correlating parameters received from the first invite request message with parameters received from the second invite request messages, and the application server releasing resources on the source network after receiving the second invite transition request.

20. The communications network in claim 19 wherein the session description protocol information in the first invite message includes an IP addressing for the target network.

21. The communications network in claim 19 wherein the session description protocol information in the first invite message includes a port number used for the target network.

22. The communications network in claim 19 wherein the session description protocol information in the second invite message includes an IP addressing for the target network.

\* \* \* \* \*